Jan. 28, 1930.  W. GEITHLE  1,745,090
ENDLESS CUTTER
Filed July 19, 1927

William Geithle
INVENTOR.

BY
Bryant & Lowry
ATTORNEYS.

Patented Jan. 28, 1930

1,745,090

UNITED STATES PATENT OFFICE

WILLIAM GEITHLE, OF CLARKSBURG, CALIFORNIA

ENDLESS CUTTER

Application filed July 19, 1927. Serial No. 207,001.

This invention relates to improvements in endless cutters for ditch digging or excavating machines of the type employing a digger boom carrying an endless driving chain on which the cutting members are mounted.

The primary object of the present invention is to provide an endless cutter of the above kind which is extremely simple and durable in construction as well as efficient in operation.

A more specific object of the present invention is to provide an improved form of cutting member for the endless driving chain of the digger boom of a digging or excavating machine, by means of which an effective digging or cutting action is had, and from which the dirt will readily free itself during the digging operation.

Still another object is to provide and endless cutter of the above kind embodying cutting members of such form and so arranged as to insure against objectionable adhering of the dirt to the cutting members, while insuring an efficient and expeditious ditch digging operation.

Other objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a fragmentary side elevational view of the digger boom of a ditch digging or excavating machine, equipped with an endless cutter constructed in accordance with the present invention;

Figure 1:
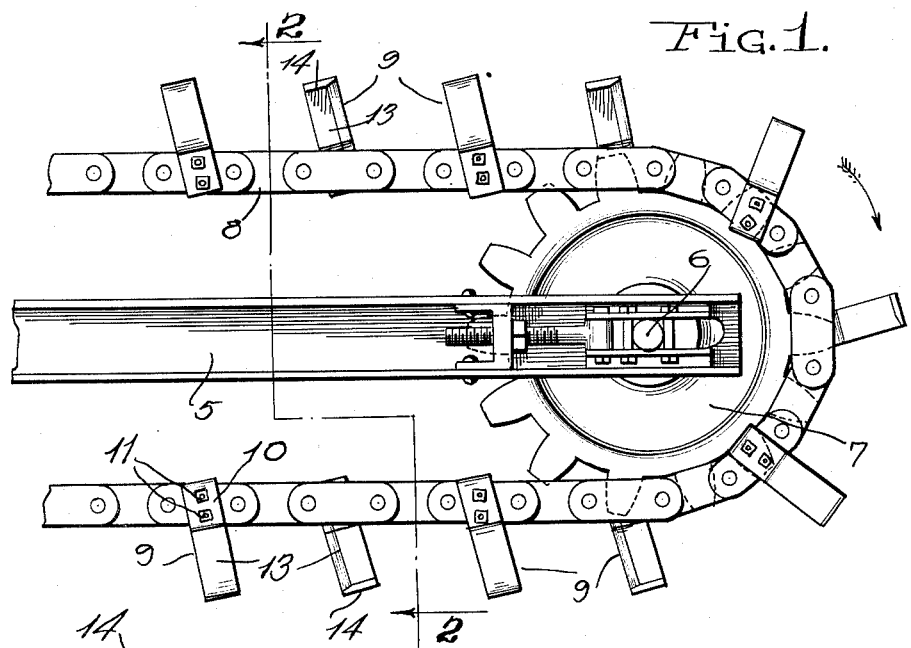

Referring more in detail to the drawing, the digger boom is of a generally well known type having a frame composed of a pair of spaced parallel longitudinal beams 5 suitably rigidly mounted in spaced side by side relation and having a transverse foot shaft 6 mounted in their outer or forward free ends. It will be understood that the boom is usually mounted at its rear end, not shown, for vertical swinging movement so that the boom may be readily adjusted vertically by raising and lowering the forward end thereof, and carried by the foot shaft 6 is the usual idler sprocket 7 about which the endless driving chain 8 passes.

The chain 8 is preferably of that type embodying alternating pairs of inner and outer links, and mounted at regular intervals upon and alternately at opposite sides of the chain 8 are the cutting members 9 forming part of the present invention.

Figures 2, 3:
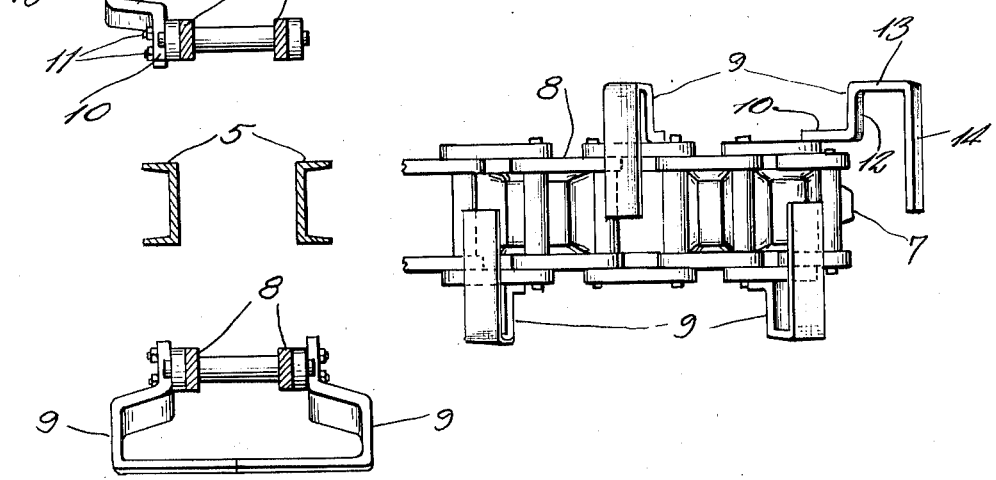
Figure 2 is a vertical transverse section taken on line 2—2 of Figure 1.
Figure 3 is a fragmentary top plan view of the device shown in Figure 1, with the frame members of the boom omitted.

Each cutter 9 is preferably formed from a piece of strap metal to include an angular shank composed of an inner arm 10 adapted to be rigidly secured by bolting or riveting as at 11 to the outer side of an outer link of the chain, and an outer arm 12 projecting laterally from the outer end of the inner arm 10 of the shank in a direction away from the adjacent side of the chain. Each cutting member further includes an angular cutting blade including an inner arm 13 projecting outwardly from the outer end of the shank arm 12, and an outer arm 14 projecting inwardly from the outer end of the arm 14 or toward the chain 8 so as to overlie the latter as clearly illustrated in Figures 2 and 3. In this way, the vertical inner arms 13 of the cutters are disposed in a plane outwardly of the sides of the driving chain to insure cutting of a ditch wider than the chain, and the outer horizontal arms 14 of the cutting blades preferably project inwardly past the longitudinal medial line of the chain 8 so that the cutting members will effect overlapping cuts. By alternately mounting the cutting members upon opposite sides of the chain, and arranging said cutting members to face inwardly or toward each other as shown clearly in the several views, the ditch is cut as cleanly as is effected with a substantially U-shaped cutting blade, but an advantage is had over the latter by reason of the fact that the present cutting blades are left open at the inner sides for leaving a clearance which insures freeing of the dirt from the cutting blades when the endless cutter is in operation. The forward edges of the cutting blades or the arms 13 and 14 thereof are sharpened, and the cutting members are fixed to the chain 8 in a backwardly inclined position relative to the direction of travel of the cutter so that these cutting edges of the arms 14 of the blades are furthest from the chain. On account of this setting of the cutting members, they will be in a position to exert a positive cutting or digging effect in the dirt when they first pass around the idler sprocket 7 of the boom and contact with the dirt. Moreover, this setting of the blades insures proper positioning thereof for conveying the loose dirt rearwardly by each cutter as it completes its cutting operation in passing around the idler sprocket 7.

From the foregoing description it will be seen that I have produced a device by means of which the objects set forth herein are fulfilled.

Minor changes may be made without departing from the spirit and scope of the invention as claimed.

What I claim as new is:—

1. In a cutter for ditch digging machines, a driving element, and cutting members attached at intervals to and alternately upon opposite sides of said driving element, each cutting member embodying an angular shank having a vertical arm attached to the driving element, and a horizontal arm projecting laterally outwardly from the latter, and an angular cutting blade including a vertical cutting arm projecting outward from said horizontal arm of the shank and a horizontal cutting arm projecting laterally inward from said vertical cutting arm.

2. In a cutter for ditch digging machines, a driving element, and cutting members attached at intervals to and alternately upon opposite sides of said driving element, each cutting member embodying an angular shank having a vertical arm attached to the driving element, and a horizontal arm projecting laterally outwardly from the latter, and an angular cutting blade including a vertical cutting arm projecting outward from said horizontal arm of the shank and a horizontal cutting arm projecting laterally inward from said vertical cutting arm, said cutting members being inclined backwardly relative to the path of travel of the driving element to position the horizontal cutting arms of the blades at an angle to said path with the cutting edges of said horizontal cutting arms positioned furthest from the driving element.

In testimony whereof I affix my signature.

WILLIAM GEITHLE.